United States Patent
Sokolov et al.

(10) Patent No.: US 10,469,457 B1
(45) Date of Patent: Nov. 5, 2019

(54) SYSTEMS AND METHODS FOR SECURELY SHARING CLOUD-SERVICE CREDENTIALS WITHIN A NETWORK OF COMPUTING DEVICES

(71) Applicant: Symantec Corporation, Mountain View, CA (US)

(72) Inventors: Ilya Sokolov, Boston, MA (US); Keith Newstadt, West Newton, MA (US)

(73) Assignee: Symantec Corporation, Mountain View, CA (US)

( * ) Notice: Subject to any disclaimer, the term of this patent is extended or adjusted under 35 U.S.C. 154(b) by 49 days.

(21) Appl. No.: 15/276,105

(22) Filed: Sep. 26, 2016

(51) Int. Cl.
*H04L 29/06* (2006.01)

(52) U.S. Cl.
CPC .......... *H04L 63/0428* (2013.01); *H04L 63/06* (2013.01); *H04L 63/061* (2013.01); *H04L 63/062* (2013.01); *H04L 63/20* (2013.01)

(58) Field of Classification Search
CPC . H04L 63/062; H04L 63/0428; H04L 63/061; H04L 63/20; H04L 63/06
See application file for complete search history.

(56) References Cited

U.S. PATENT DOCUMENTS

| | | |
|---|---|---|
| 3,740,718 A | 6/1973 | Melvin, Jr. |
| 3,744,043 A | 7/1973 | Walden et al. |
| 5,867,578 A * | 2/1999 | Brickell .................. G06F 21/40 380/286 |
| 6,100,811 A | 8/2000 | Hsu et al. |
| 6,903,683 B1 | 6/2005 | Nicholson |
| 6,970,183 B1 | 11/2005 | Monroe |
| 7,657,097 B2 | 2/2010 | Silic |
| 7,925,751 B1 | 4/2011 | Bolinger et al. |

(Continued)

FOREIGN PATENT DOCUMENTS

| | | |
|---|---|---|
| AU | 2013371346 B2 | 3/2017 |
| CA | 2 895 265 C | 2/2018 |

(Continued)

OTHER PUBLICATIONS

Nair, Jayakrishnan, et al. "On channel failures, file fragmentation policies, and heavy-tailed completion times." IEEE/ACM Transactions on Networking 24.1 (2016): 529-541. (Year: 2016).*

(Continued)

*Primary Examiner* — Kari L Schmidt
(74) *Attorney, Agent, or Firm* — FisherBroyles, LLP

(57) ABSTRACT

A computer-implemented method for securely sharing cloud-service credentials within a network of computing devices may include (i) identifying, by a central computing device, a set of networked devices, (ii) encrypting, by the central computing device, at least one user credential for a cloud service, (iii) dividing, by the central computing device, a decryption key for decrypting the user credential into a set of fragments such that a minimum number of fragments, as defined by a security policy, is required to decrypt the user credential, and (iv) securing the user credential by distributing the set of fragments of the decryption key from the central computing device to the set of networked devices in compliance with the security policy. Various other methods, systems, and computer-readable media are also disclosed.

20 Claims, 7 Drawing Sheets

(56) References Cited

U.S. PATENT DOCUMENTS

| | | |
|---|---|---|
| 8,261,976 B1 | 9/2012 | Block et al. |
| 8,316,421 B2 | 11/2012 | Etchegoyen |
| 8,620,841 B1 | 12/2013 | Filson et al. |
| 8,719,590 B1* | 5/2014 | Faibish .................. H04L 9/085 |
| | | 713/190 |
| 8,726,405 B1 | 5/2014 | Bailey et al. |
| 8,925,037 B2 | 12/2014 | Marino et al. |
| 9,154,466 B2 | 10/2015 | Sobel et al. |
| 9,171,178 B1* | 10/2015 | Banerjee ................ G06F 21/62 |
| 9,202,173 B1 | 12/2015 | Dotan et al. |
| 9,218,468 B1 | 12/2015 | Rappaport |
| 9,282,435 B2 | 3/2016 | Ward et al. |
| 9,396,599 B1 | 7/2016 | Malhotra |
| 9,479,250 B2 | 10/2016 | Mitchell |
| 9,661,483 B2 | 5/2017 | Bastianelli |
| 9,697,660 B1 | 7/2017 | Sokolov et al. |
| 9,817,958 B1 | 11/2017 | McCorkendale |
| 9,954,680 B1* | 4/2018 | Machani ................ H04L 9/085 |
| 10,116,513 B1 | 10/2018 | Sundaram |
| 10,326,733 B2 | 6/2019 | Bokare et al. |
| 10,375,114 B1 | 8/2019 | Gu et al. |
| 2002/0059532 A1 | 5/2002 | Ata et al. |
| 2002/0080938 A1 | 6/2002 | Alexander, III et al. |
| 2003/0172280 A1* | 9/2003 | Scheidt .............. H04L 63/0442 |
| | | 713/182 |
| 2003/0216143 A1 | 11/2003 | Roese et al. |
| 2004/0143556 A1 | 7/2004 | Graubart et al. |
| 2004/0153671 A1 | 8/2004 | Schuyler et al. |
| 2005/0097320 A1 | 5/2005 | Golan et al. |
| 2006/0031682 A1 | 2/2006 | Sakai et al. |
| 2006/0082439 A1 | 4/2006 | Bazakos et al. |
| 2006/0164282 A1 | 7/2006 | Duff et al. |
| 2006/0210167 A1 | 9/2006 | Inoue et al. |
| 2007/0171921 A1 | 7/2007 | Wookey et al. |
| 2007/0210910 A1 | 9/2007 | Norstrom et al. |
| 2008/0018458 A1 | 1/2008 | Derrick et al. |
| 2009/0043445 A1 | 2/2009 | Bishop et al. |
| 2009/0198112 A1 | 8/2009 | Park et al. |
| 2010/0005526 A1 | 1/2010 | Tsuji et al. |
| 2010/0014721 A1 | 1/2010 | Steinberg et al. |
| 2010/0024042 A1 | 1/2010 | Motahari et al. |
| 2010/0037056 A1* | 2/2010 | Follis ................ G06F 11/1464 |
| | | 713/171 |
| 2010/0083385 A1* | 4/2010 | Uchida ................ G06F 21/606 |
| | | 726/30 |
| 2010/0205667 A1 | 8/2010 | Anderson et al. |
| 2010/0281254 A1 | 11/2010 | Carro |
| 2010/0299002 A1 | 11/2010 | Abdallah et al. |
| 2010/0302143 A1 | 12/2010 | Spivack |
| 2010/0325712 A1 | 12/2010 | Kakuta et al. |
| 2011/0206285 A1 | 8/2011 | Hodge et al. |
| 2011/0219423 A1 | 9/2011 | Aad et al. |
| 2011/0219427 A1 | 9/2011 | Hito et al. |
| 2011/0225426 A1 | 9/2011 | Agarwal et al. |
| 2011/0246766 A1* | 10/2011 | Orsini ................ G06F 11/1076 |
| | | 713/160 |
| 2011/0247069 A1 | 10/2011 | Slater |
| 2011/0252131 A1 | 10/2011 | Karaoguz |
| 2011/0293095 A1 | 12/2011 | Ben Ayed |
| 2011/0321137 A1 | 12/2011 | Iida et al. |
| 2011/0321143 A1 | 12/2011 | Angaluri et al. |
| 2012/0011559 A1 | 1/2012 | Miettinen et al. |
| 2012/0044089 A1 | 2/2012 | Yamold et al. |
| 2012/0072719 A1 | 3/2012 | Hui et al. |
| 2012/0079576 A1 | 3/2012 | Han et al. |
| 2012/0139755 A1 | 6/2012 | Ginsberg |
| 2012/0181333 A1* | 7/2012 | Krawczewicz .... G06K 19/0718 |
| | | 235/380 |
| 2012/0185910 A1 | 7/2012 | Miettinen et al. |
| 2012/0190386 A1 | 7/2012 | Anderson |
| 2012/0198570 A1 | 8/2012 | Joa et al. |
| 2012/0239929 A1* | 9/2012 | Newman ................ H04L 63/06 |
| | | 713/168 |
| 2012/0243687 A1* | 9/2012 | Li .......................... H04L 9/085 |
| | | 380/277 |
| 2012/0246739 A1 | 9/2012 | Mebed |
| 2012/0331527 A1 | 12/2012 | Walters et al. |
| 2013/0010966 A1* | 1/2013 | Li .......................... H04L 9/085 |
| | | 380/278 |
| 2013/0097709 A1 | 4/2013 | Basavapatna et al. |
| 2013/0102283 A1 | 4/2013 | Lau et al. |
| 2013/0103482 A1 | 4/2013 | Song et al. |
| 2013/0104203 A1 | 4/2013 | Davis et al. |
| 2013/0151617 A1 | 6/2013 | Davis |
| 2013/0159876 A1 | 6/2013 | Narasimhan et al. |
| 2013/0177157 A1* | 7/2013 | Li .......................... H04L 9/083 |
| | | 380/277 |
| 2013/0197998 A1 | 8/2013 | Buhrmann et al. |
| 2013/0227712 A1 | 8/2013 | Salem et al. |
| 2013/0262873 A1 | 10/2013 | Read et al. |
| 2013/0275498 A1 | 10/2013 | Cheng et al. |
| 2013/0290201 A1 | 10/2013 | Rodriguez Carrillo |
| 2013/0298248 A1 | 11/2013 | Boldrev et al. |
| 2013/0318580 A1 | 11/2013 | Gudlavenkatasiva et al. |
| 2013/0318625 A1 | 11/2013 | Fan |
| 2013/0340089 A1 | 12/2013 | Steinberg et al. |
| 2014/0007225 A1 | 1/2014 | Gay et al. |
| 2014/0025485 A1 | 1/2014 | Niemeijer et al. |
| 2014/0040137 A1 | 2/2014 | Carlson et al. |
| 2014/0040467 A1 | 2/2014 | Agarwal et al. |
| 2014/0067679 A1 | 3/2014 | O'Reilly et al. |
| 2014/0068702 A1 | 3/2014 | Hyndman et al. |
| 2014/0082715 A1 | 3/2014 | Grajek et al. |
| 2014/0112537 A1 | 4/2014 | Frank et al. |
| 2014/0121476 A1 | 5/2014 | Tran et al. |
| 2014/0123255 A1 | 5/2014 | Etchegoyen |
| 2014/0130127 A1 | 5/2014 | Toole et al. |
| 2014/0173700 A1* | 6/2014 | Awan .................... H04L 63/107 |
| | | 726/4 |
| 2014/0189786 A1 | 7/2014 | Castro et al. |
| 2014/0201377 A1 | 7/2014 | Kadishay et al. |
| 2014/0282870 A1 | 9/2014 | Markwordt et al. |
| 2014/0380444 A1 | 12/2014 | Kelley |
| 2015/0019873 A1 | 1/2015 | Hagemann |
| 2015/0069219 A1 | 3/2015 | Klein et al. |
| 2015/0082399 A1* | 3/2015 | Wu ...................... G06F 21/6209 |
| | | 726/6 |
| 2015/0089231 A1* | 3/2015 | Oxford .................. H04L 9/0869 |
| | | 713/171 |
| 2015/0089568 A1 | 3/2015 | Sprague et al. |
| 2015/0237038 A1 | 8/2015 | Grajek et al. |
| 2015/0288687 A1 | 10/2015 | Heshmati et al. |
| 2015/0324559 A1 | 11/2015 | Boss et al. |
| 2015/0349883 A1 | 12/2015 | Mitchell |
| 2015/0363986 A1 | 12/2015 | Hoyos et al. |
| 2016/0007083 A1 | 1/2016 | Gurha |
| 2016/0012655 A1 | 1/2016 | Hanson et al. |
| 2016/0044001 A1* | 2/2016 | Pogorelik ............ H04L 63/0428 |
| | | 713/168 |
| 2016/0057110 A1 | 2/2016 | Li et al. |
| 2016/0063640 A1 | 3/2016 | Ellingsworth |
| 2016/0068264 A1 | 3/2016 | Ganesh et al. |
| 2016/0080252 A1 | 3/2016 | Ramchandran et al. |
| 2016/0082926 A1 | 3/2016 | Mouser et al. |
| 2016/0087950 A1* | 3/2016 | Barbir .................... H04L 63/062 |
| | | 713/171 |
| 2016/0112522 A1 | 4/2016 | Abello et al. |
| 2016/0112871 A1 | 4/2016 | White |
| 2016/0132684 A1* | 5/2016 | Barbas ................ G06F 21/602 |
| | | 713/165 |
| 2016/0140257 A1 | 5/2016 | Vega |
| 2016/0164922 A1 | 6/2016 | Boss et al. |
| 2016/0165650 A1 | 6/2016 | Kim et al. |
| 2016/0165651 A1 | 6/2016 | Pathuri et al. |
| 2016/0212109 A1* | 7/2016 | Hird ...................... H04L 63/062 |
| 2016/0239683 A1* | 8/2016 | Gujral ................ G06F 21/6272 |
| 2016/0241390 A1* | 8/2016 | Harris .................... H04L 9/083 |
| 2016/0316449 A1 | 10/2016 | Pitt et al. |
| 2016/0358441 A1 | 12/2016 | Mittleman et al. |
| 2016/0380650 A1* | 12/2016 | Calder ................ G06F 11/1076 |
| | | 714/766 |

(56) References Cited

U.S. PATENT DOCUMENTS

| | | |
|---|---|---|
| 2017/0053280 A1 | 2/2017 | Lishok et al. |
| 2017/0083345 A1 | 3/2017 | Sol |
| 2017/0163666 A1 | 6/2017 | Venkatramani et al. |
| 2017/0195429 A1 | 7/2017 | Bokare et al. |
| 2017/0255940 A1 | 9/2017 | Kohli |
| 2018/0027517 A9 | 1/2018 | Noonan |
| 2018/0103021 A1 | 4/2018 | Arunkumar et al. |
| 2018/0211464 A1 | 7/2018 | Kusens et al. |
| 2018/0212976 A1 | 7/2018 | Arunkumar et al. |
| 2018/0249398 A1 | 8/2018 | Hillary et al. |

FOREIGN PATENT DOCUMENTS

| | | |
|---|---|---|
| CN | 101950332 A | 1/2011 |
| CN | 202795383 U | 3/2013 |
| CN | 103354931 A | 10/2013 |
| CN | 105874464 B | 1/2019 |
| EP | 1 703 431 A2 | 9/2006 |
| EP | 2 941 733 A1 | 11/2015 |
| EP | 3 087 531 A1 | 11/2016 |
| EP | 3166086 A1 | 5/2017 |
| JP | 2006-259930 A | 9/2006 |
| JP | 2007-304834 A | 11/2007 |
| JP | 2007293062 A | 11/2007 |
| JP | 2009-086891 A | 4/2009 |
| JP | 2009140051 A | 6/2009 |
| JP | 2010128778 A | 5/2010 |
| JP | 2011-004214 A | 1/2011 |
| JP | 2011-134137 A | 7/2011 |
| JP | 2012-235424 A | 11/2012 |
| JP | 2012-248027 A | 12/2012 |
| JP | 2013-246465 A | 12/2013 |
| JP | 2014-086865 A | 5/2014 |
| JP | 2016-503208 A | 2/2016 |
| JP | 6205062 B2 | 9/2017 |
| JP | 6314267 B2 | 4/2018 |
| WO | WO 2012/162009 A1 | 11/2012 |
| WO | 2013/101215 A1 | 7/2013 |
| WO | 2014/107435 A1 | 7/2014 |
| WO | 2015/100192 A1 | 7/2015 |

OTHER PUBLICATIONS

Ciriani, Valentina, et al. "Combining fragmentation and encryption to protect privacy in data storage." ACM Transactions on Information and System Security (TISSEC) 13.3 (2010): 22. (Year: 2010).*

A. Mei, L. V. Mancini and S. Jajodia, "Secure dynamic fragment and replica allocation in large-scale distributed file systems," in IEEE Transactions on Parallel and Distributed Systems, vol. 14, No. 9, pp. 885-896, Sep. 2003. (Year: 2003).*

M. Zola, V. Bioglio, C. Anglano, R. Gaeta, M. Grangetto and M. Sereno, "ENIGMA: Distributed Virtual Disks for Cloud Computing," 2011 IEEE International Symposium on Parallel and Distributed Processing Workshops and Phd Forum, Shanghai, 2011, pp. 898-906. (Year: 2011).*

Fake GPS Location app, https://play.google.com/store/apps/details?id=com.lexa.fakegps&hl=en, as accessed Feb. 23, 2017, Lexa Tools.

How SUPL Reveals My Identity and Location to Google When I Use GPS, http://mobilesociety.typepad.com/mobile_life/2014/08/supl-reveals-my-identity-and-location-to-google.html, published Aug. 31, 2014, Mobilesociety.

Assisted GPS, https://en.wikipedia.org/wiki/Assisted_GPS, as accessed Feb. 24, 2017, Wikipedia.

Lei Gu, et al; Systems and Methods for Enforcing Access-Control Policies; U.S. Appl. No. 15/194,403, filed Jun. 27, 2016.

HomeNews—WiFi can be used to count people with or without electronic gadgets; https://www.rt.com/news/266188-wifi-signal-human-density/; as accessed on Jun. 21, 2016; Jun. 10, 2015.

Ali et al.; Keystroke Recognition Using WiFi Signals; https://www.sigmobile.org/mobicom/2015/papers/p90-aliA.pdf; Sep. 7, 2015.

IRobot's Roomba 980 Maps Your Home via Camera and Takes Smartphone Commands; http://blogs.wsj.com/personal-technology/2015/09/16/irobots-roomba-980-maps-your-home-via-camera-and-takes-smartphone-commands/; as accessed on Jun. 21, 2016; Sep. 16, 2015.

Microsoft Hololens; https://www.microsoft.com/microsoft-hololens/en-us; as accessed on Jun. 21, 2016.

Bruce McCorkendale, et al; Systems and Methods for Constructing a Volumetric Model of a Space from a Constellation of Sensing Devices; U.S. Appl. No. 14/833,655, filed Aug. 24, 2015.

Daniel Marino, et al; Systems and Methods for Enforcing Data-Loss-Prevention Policies Using Mobile Sensors; U.S. Appl. No. 13/733,131, filed Jan. 2, 2013.

Devicelock; Preventing Devastating Data Leaks by Securing the Endpoints of Your Network; http://www.devicelock.com/products/, as accessed on Sep. 10, 2012.

Konstantinos Kotis et al.; An ontology for the automated deployment of applications in heterogeneous IoT environments; http://www.semantic-web-journal.net/sites/default/files/swj247_0.pdf, as accessed Jun. 25, 2015; Semantic Web Journal; Feb. 13, 2012.

OMA Device Management; http://openmobilealliance.org/about-oma/work-program/device-management/, as accessed Jun. 25, 2015; Jan. 15, 2013.

Open Mobile Alliance (OMA); http://openmobilealliance.org/, as accessed Jun. 25, 2015; Aug. 2, 2002.

OpenHAB; http://www.openhab.org/, as accessed Jun. 25, 2015; Jul. 11, 2011.

Daniel Siewiorek; SenSay: A Context-Aware Mobile Phone; Human Computer Interaction and Institute for Complex Engineered Systems; As accessed on Sep. 10, 2012.

Megan Treacy; 10 environmental sensors that go along with you; http://www.treehugger.com/clean-technology/environmental-sensors.html, as accessed Jun. 25, 2015; Mar. 5, 2013.

Zenprise; Mobile DLP (Data Leakage Prevention); http://www.zenprise.com/solutions/mobile-data-leakage-prevention/, as accessed on Sep. 10, 2012.

Alastair R. Beresford et al., MockDroid: trading privacy application functionality on smartphones; Proceedings of the 12th Workshop on Mobile Computing Systems and Applications, HotMobile '11, Phoenix, Arizona, Mar. 1-3, 2011.

Jason Franklin et al.; Passive Data Link Layer 802.11 Wireless Device Driver Fingerprinting; Proceedings of USENIX Security '06, Jul. 31-Aug. 4, 2006, Vancouver, BC, Canada.

School of Privacy, Guide on How to be Safe, Secure and Protect Your Online Anonymity; Fake GPS Location—Android; http://school-of-privacy.com/post/70381068300/fake-gps-location-andoid; Dec. 18, 2013.

SensorSimulator; https://code.google.com/p/openintents/wiki/SensorSimulator; Jan. 12, 2013.

William E. Sobel, et al.; Systems and Methods for Introducing Variation in Sub-System Output Signals to Prevent Device Fingerprinting; U.S. Appl. No. 14/139,824, filed Dec. 23, 2013.

C. Rigney et al; Remote Authentication Dial in User Service (RADIUS); https://tools.ietf.org/html/rfc2865, as accessed Nov. 6, 2015; Request for Comments: 2865; Jun. 2000.

C. Neuman et al; The Kerberos Network Authentication Service (V5); https://tools.ietf.org/html/rfc4120, as accessed Nov. 6, 2015; Request for Comments: 4120; Jul. 2005.

Kerberos: The Network Authentication Protocol; http://web.mit.edu/kerberos/, as accessed Nov. 6, 2016; Jan. 28, 1999.

Microsoft Negotiate; https://msdn.microsoft.com/en-us/library/windows/desktop/aa378748(v=vs.85).aspx. as accessed Nov. 6, 2015; Nov. 13, 2011.

Microsoft NTLM; https://msdn.microsoft.com/en-us/library/windows/desktop/aa378749(v=vs.85).aspx, as accessed Nov. 6, 2015; Nov. 12, 2011.

Prasad Bokare, et al; Systems and Methods for Facilitating Single Sign-On for Multiple Devices; U.S. Appl. No. 15/041,040, filed Feb. 11, 2016.

Symantec Identity Access Manager; https://www.symantec.com/identity-access-manager/, as accessed Nov. 6, 2015; Symantec Corporation; Nov. 7, 2014.

(56) References Cited

OTHER PUBLICATIONS

Symantec Validation and ID Protection Service; http://www.symantec.com/vip-authentication-service/, as accessed Nov. 6, 2015; Symantec Corporation; Feb. 10, 2014.
Ramakrishnan Meenakshi Sundaram; Systems and Methods for Managing Smart Building Systems; U.S. Appl. No. 15/041,002, filed Feb. 10, 2016.
ZigBee Alliance, http://www.zigbee.org/, as accessed Dec. 14, 2015, (Nov. 14, 2001).
Z-Wave, http://www.z-wave.com/, as accessed Dec. 14, 2015, (Dec. 23, 2002).
OMA Device Management Working Group, http://openmobilealliance.org/about-oma/work-program/device-management/, as accessed Dec. 14, 2015, (Jan. 15, 2013).
Lei Gu, et al; Systems and Methods for Enforcing Access-Control Policies in an Arbitrary Physical Space; U.S. Appl. No. 15/195,677, filed Jun. 28, 2016.
Bruce McCorkendale; Systems and Methods for Authenticating Users; U.S. Appl. No. 14/834,949, filed Aug. 25, 2015.
Home—Good Security Questions; http://goodsecurityquestions.com/, as accessed Jun. 25, 2015, (Dec. 27, 2007).
Kevin Jiang, et al; Systems and Methods for Using Vehicles as Information Sources for Knowledge-Based Authentication; U.S. Appl. No. 14/979,620, filed Dec. 28, 2015.
Snapshot; https://www.progressive.com/auto/snapshot/, as accessed Nov. 18, 2015; Progressive Casualty Insurance Company; On or before Nov. 18, 2015.
FasTrak; https://www.bayareafastrak.org/en/howitworks/gettingstarted.shtml, as accessed Nov. 18, 2015; On or before Nov. 18, 2015.
Ilya Sokolov, et al; Systems and Methods for Verifying User Attributes; U.S. Appl. No. 14/985,675, filed Dec. 31, 2015.
E-ZPass, https://www.e-zpassny.com/en/home/index.shtml, as accessed Nov. 18, 2015, (On or before Nov. 18, 2015).
Fastpass, https://disneyland.disney.go.com/guest-services/fastpass/, as accessed Nov. 18, 2015, Disney, (On or before Nov. 18, 2015).
Toll Payment Options at the Golden Gate Bridge, http://www.goldengate.org/tolls/tollpaymentoptions.php, as accessed Nov. 18, 2015, (On or before Nov. 18, 2015).
OnStar, https://www.onstar.com/us/en/home.html, as accessed Nov. 18, 2015, (On or before Nov. 18, 2015).
BMW Assist, http://www.bmwusa.com/Standard/Content/Explore/BMWValue/BMWAssist/default.aspx, as accessed Nov. 18, 2015, (On or before Nov. 18, 2015).
Department of Motor Vehicles, https://www.dmv.ca.gov/portal/dmv, as accessed Nov. 18, 2015, (On or before Nov. 18, 2015).
Ilya Sokolov, et al; Systems and Methods for Evaluating Identity Intensity; U.S. Appl. No. 15/057,618, filed Mar. 1, 2016.
Evgenios Kornaropoulos, et al; Systems and Methods for Securely Detecting Data Similarities; U.S. Appl. No. 14/871,868, filed Sep. 30, 2015.
Symantec VIP Intelligent Authentication, http://www.symantec.com/content/en/us/enterprise/fact_sheets/b-vip_intelligent_authentication_DS_21213685.en-us.pdf, as accessed Jan. 13, 2016, Data Sheet: Authentication, Symantec Corporation, (Oct. 2011).
Ilya Sokolov et al; Systems and Methods for Certifying Geolocation Coordinates of Computing Devices; U.S. Appl. No. 15/466,156, filed Mar. 22, 2017.
Amazon Echo, Nov. 6, 2014: https://en.wikipedia.org/wiki/Amazon_Echo.
Google Home, announced May 18, 2016: https://en.wikipedia.org/wiki/Google_Home.
Secret sharing, as accessed on Sep. 13, 2016: https://en.wikipedia.org/wiki/Secret_sharing.
Norton Identity Safe, announced Aug. 28, 2007: https://identitysafe.norton.com/.
Abadi et al., "Traffic Flow Predicition for Road Transporation Networks with Limited Traffic Data", IEEE Transactions on Intelligent Transportation Systems, vol. 16, No. 2, Apr. 2015, pp. 653-662.
Baek et al, "An Authentication Framework for Automatic Dependent Surveillance-Broadcast Based on Online/Offline Identity-Based Signature", 2013 Eighth International Conference on P2P, Parallel, Grid, Cloud and Internet Computing, 2013, pp. 358-363.
Buhrmann et al., "Mobile Wallet Security", U.S. Appl. No. 61/591,232, filed Jan. 26, 2012, 18 pages.
Salem et al., "Adaptive Risk-Based Access Controls", U.S. Appl. No. 61/602,427, filed Feb. 23, 2012, 17 pages.
Temple, James, "Accelerometer IDs smartphones in seconds", SFGATE, URL: http://www.sfgate.com/technology/dotcommentary/article/accelerometer-IDs-smartphone-in-seconds-4885711.php, Oct. 10, 2013, 6 pages.
International Search Report and Written Opinion received for International Patent Application Serial No. PCT/US2013/078319 dated Apr. 16, 2014, 7 pages.
International Search Report and Written Opinion received for International Patent Application Serial No. PCT/US2014/071791 dated Mar. 19, 2015, 8 pages.

\* cited by examiner

SYSTEMS AND METHODS FOR SECURELY SHARING CLOUD-SERVICE CREDENTIALS WITHIN A NETWORK OF COMPUTING DEVICES

BACKGROUND

Smart devices, such as Internet of Things (IOT) devices, often allow users to access cloud-based services through a network connection. Security solutions for a network of smart devices in a smart building can provide users with the ability to manage digital credentials for these cloud-based services. Traditionally, security software may prevent attacks inside the smart building or prevent breaches to the building. For example, a smart home system may ensure only registered users in the building may access devices that can connect to a cloud service. Individual devices are then able to store user credentials for cloud services and use them as needed.

However, in some cases, a device may be removed from the network and may cause a compromise to the security of user credentials. For example, a smart device containing financial payment information may be stolen and pose a risk to the owner. Furthermore, devices may be temporarily removed for servicing or repairs or may be replaced with new devices without first removing stored credentials. In other cases, a user credential may be stored on a crucial device, and the removal of the device may cause the credential to be lost. Therefore, a better method of storing credential information is needed to prevent possible breaches due to physical removal of devices from a network. Accordingly, the instant disclosure identifies and addresses a need for additional and improved systems and methods for securing cloud-service credentials within a network of computing devices.

SUMMARY

As will be described in greater detail below, the instant disclosure describes various systems and methods for securely sharing cloud-service credentials within a network of computing devices. In one example, a computer-implemented method for securely sharing cloud-service credentials within a network of computing devices may include (i) identifying, by a central computing device, a set of networked devices, (ii) encrypting, by the central computing device, at least one user credential for a cloud service, (iii) dividing, by the central computing device, a decryption key for decrypting the user credential into a set of fragments such that a minimum number of fragments, as defined by a security policy, is required to decrypt the user credential, and (iv) securing the user credential by distributing the set of fragments of the decryption key from the central computing device to the set of networked devices in compliance with the security policy.

In some embodiments, the user credential for the cloud service may include a user identifier, a password, a user key, and/or an account name. Additionally or alternatively, the user credential may include a digital certificate and/or a user token.

In some examples, the minimum number of fragments required to decrypt the user credential may include a number less than a total number of devices in the set of networked devices. In these examples, the security policy may include a distribution policy based on a type of networked device, the total number of devices in the set of networked devices, a type of user credential, and/or an importance of a fragment of the decryption key to reconstructing the decryption key. Additionally or alternatively, the security policy may include an access policy based on the type of networked device and/or a type of cloud service.

In one embodiment, distributing the set of fragments of the decryption key may include assigning at least one fragment of the decryption key to each networked device within the set of networked devices such that the networked device stores fewer than the minimum number of fragments required to decrypt the user credential.

In one example, the computer-implemented method may further include (i) detecting, by the central computing device, a request for the user credential for the cloud service from a networked device, (ii) determining, by the central computing device, that the request for the user credential complies with the security policy, (iii) collecting at least the minimum number of fragments required to decrypt the user credential from the set of networked devices, and (iv) accessing the cloud service by decrypting the user credential.

In some embodiments, accessing the cloud service may include reconstructing, by the central computing device, the decryption key using the minimum number of fragments and sending the decrypted user credential to the cloud service. In these embodiments, sending the decrypted user credential to the cloud service may include sending the decrypted user credential from the central computing device to the cloud service on behalf of the networked device and/or sending a temporary version of the decrypted user credential to the networked device.

Additionally or alternatively, in one example, accessing the cloud service may include sending a temporary version of the minimum number of fragments to the networked device to reconstruct the decryption key locally. In other examples, accessing the cloud service may include sending the minimum number of fragments to the cloud service to reconstruct the decryption key.

In one embodiment, a system for implementing the above-described method may include (i) an identification module, stored in memory, that identifies, by a central computing device, a set of networked devices, (ii) an encryption module, stored in memory, that encrypts, by the central computing device, at least one user credential for a cloud service, (iii) a division module, stored in memory, that divides, by the central computing device, a decryption key for decrypting the user credential into a set of fragments such that a minimum number of fragments, as defined by a security policy, is required to decrypt the user credential, and (iv) a security module, stored in memory, that secures the user credential by distributing the set of fragments of the decryption key from the central computing device to the set of networked devices in compliance with the security policy. In addition, the system may include at least one processor that executes the identification module, the encryption module, the division module, and the security module.

In some examples, the above-described method may be encoded as computer-readable instructions on a non-transitory computer-readable medium. For example, a computer-readable medium may include one or more computer-executable instructions that, when executed by at least one processor of a central computing device, may cause the central computing device to (i) identify, by the central computing device, a set of networked devices, (ii) encrypt, by the central computing device, at least one user credential for a cloud service, (iii) divide, by the central computing device, a decryption key for decrypting the user credential into a set of fragments such that a minimum number of fragments, as defined by a security policy, is required to decrypt the user credential, and (iv) secure the user credential by distributing the set of fragments of the decryption key from the central computing device to the set of networked devices in compliance with the security policy.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
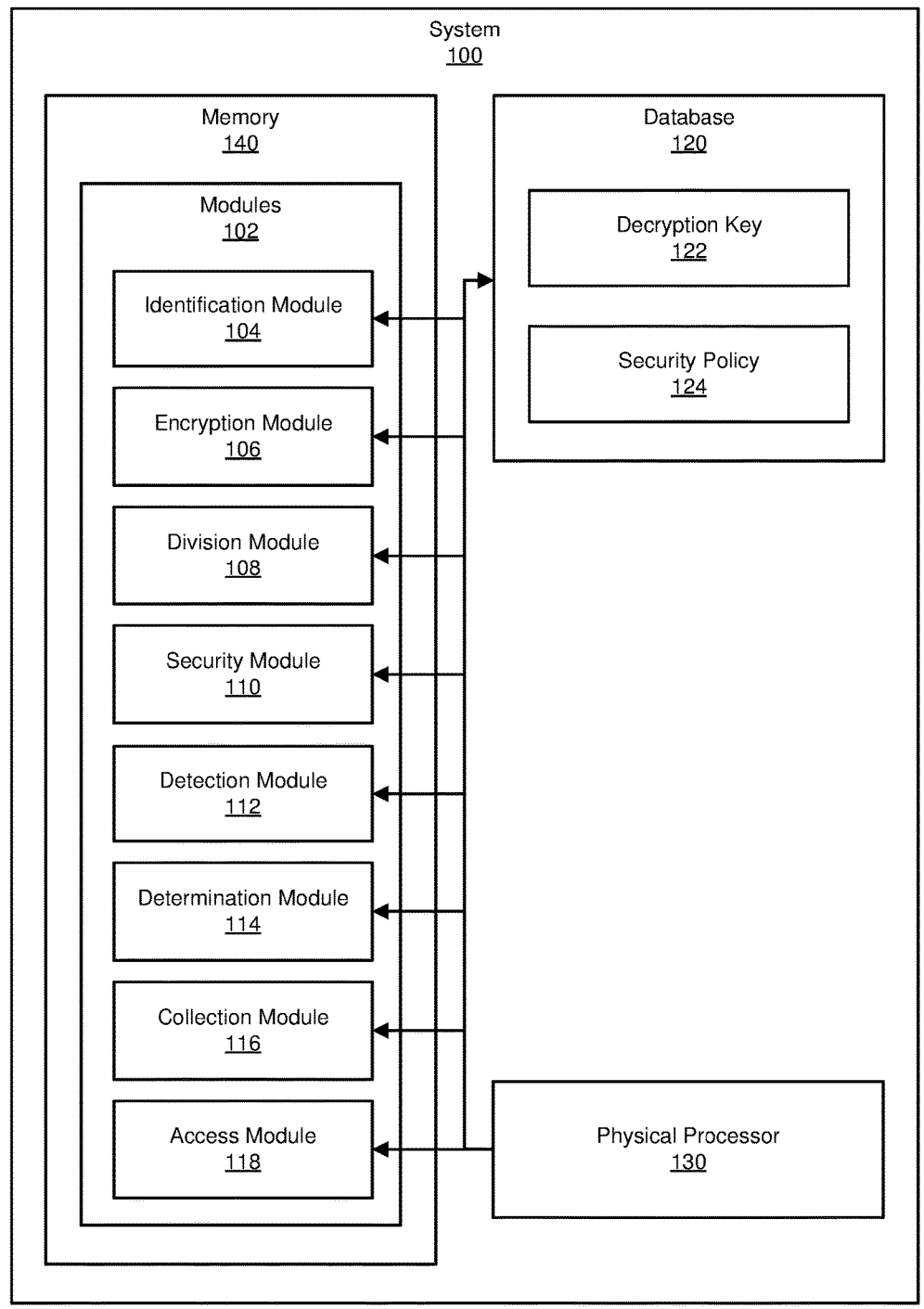
FIG. 1 is a block diagram of an example system for securely sharing cloud-service credentials within a network of computing devices.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for securely sharing cloud-service credentials within a network of computing devices. As will be explained in greater detail below, by encrypting a user credential and dividing a decryption key among multiple devices in the network of computing devices, the systems and methods described herein may better secure user credentials for cloud-based services. For example, by distributing fragments of the decryption key to multiple devices, the disclosed systems and methods may prevent the loss or theft of a single device from compromising the entire decryption key and, consequently, the user credential. Furthermore, by distributing multiple copies of fragments among the devices, the disclosed systems and methods may allow the decryption key to be reconstructed using fragments from remaining devices when access to the cloud service is requested.

In addition, the systems and methods described herein may improve the functioning of a computing device by storing decryption key fragments on networked devices, rather than user credentials for a cloud service, and increasing security for user credentials on the computing device. These systems and methods may also improve the field of smart building security and/or network security by preventing a breach of a user credential due to a breach of a single device on a network.

Figure 2:
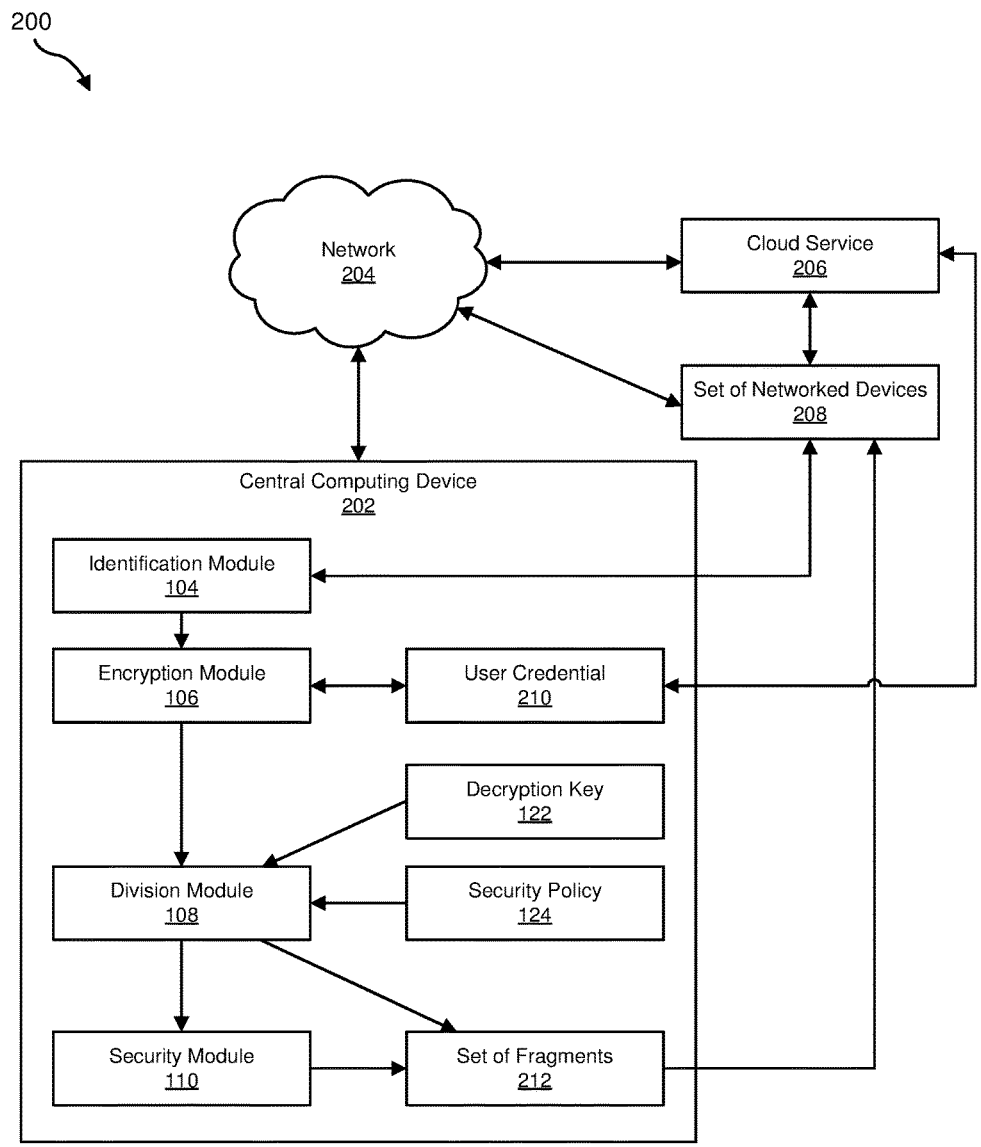
FIG. 2 is a block diagram of an additional example system for securely sharing cloud-service credentials within a network of computing devices.

The following will provide, with reference to FIGS. 1 and 2, detailed descriptions of example systems for securely sharing cloud-service credentials within a network of computing devices. Detailed descriptions of corresponding computer-implemented methods will also be provided in connection with FIG. 3. In addition, detailed descriptions of an example distribution of a set of fragments of a decryption key to a set of example devices will be provided in connection with FIG. 4. Furthermore, detailed descriptions of a request for an example user credential and decryption of the example user credential will be provided in connection with FIG. 5. Finally, detailed descriptions of an example computing system and network architecture capable of implementing one or more of the embodiments described herein will be provided in connection with FIGS. 6 and 7, respectively.

FIG. 1 is a block diagram of an example system 100 for securely sharing cloud-service credentials within a network of computing devices. As illustrated in this figure, example system 100 may include one or more modules 102 for performing one or more tasks. For example, and as will be explained in greater detail below, modules 102 may include an identification module 104 that identifies, by a central computing device, a set of networked devices. As used herein, the term "networked device" generally refers to a computing device capable of connecting to a network and receiving and/or transmitting data across the network. Examples of networked devices include, without limitation, computing devices, servers, routers, smart devices, sensors, mobile devices, variations or combinations of one or more of the same, and/or any other suitable device.

Example system 100 may additionally include an encryption module 106 that encrypts, by the central computing device, at least one user credential for a cloud service. The term "cloud service," as used herein, generally refers to a resource or service that is provided over a network, such as the Internet. Examples of cloud services include, without limitation, Software as a Service (SaaS), Platform as a Service (PaaS), Infrastructure as a Service (IaaS), digital media streaming, file hosting services, electronic commerce services, variations or combinations of one or more of the same, and/or any other suitable cloud-based service. Example system 100 may also include a division module 108 that divides, by the central computing device, a decryption key 122 for decrypting the user credential into a set of fragments such that a minimum number of fragments, as defined by a security policy 124, is required to decrypt the user credential. Example system 100 may additionally include a security module 110 that secures the user credential by distributing the set of fragments of decryption key 122 from the central computing device to the set of networked devices in compliance with security policy 124.

Furthermore, example system 100 may include a detection module 112 that detects, by the central computing device, a request for the user credential for the cloud service from a networked device. Example system 100 may also include a determination module 114 that determines, by the central computing device, that the request for the user credential complies with security policy 124. Example system 100 may additionally include a collection module 116 that collects at least the minimum number of fragments required to decrypt the user credential from the set of networked devices. Finally, example system 100 may include an access module 118 that accesses the cloud service by decrypting the user credential. Although illustrated as separate elements, one or more of modules 102 in FIG. 1 may represent portions of a single module or application or multiple modules or applications.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., central computing device 202 and/or set of networked devices 208). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate securely sharing cloud-service credentials within a network of computing devices. Examples of physical processor 130 include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, and/or any other suitable physical processor.

As illustrated in FIG. 1, example system 100 may also include one or more databases, such as database 120. In one example, database 120 may be configured to store decryption key 122, which may include decryption information for a user credential, and/or security policy 124, which may include a policy to distribute decryption key fragments and/or a policy to access cloud services. Additionally, database 120 may be configured to store a user credential for a cloud service. Database 120 may represent portions of a single database or computing device or a plurality of databases or computing devices. For example, database 120 may represent a portion of central computing device 202 and/or set of networked devices 208 in FIG. 2. Alternatively, database 120 in FIG. 1 may represent one or more physically separate devices capable of being accessed by a computing device, such as central computing device 202 and/or set of networked devices 208 in FIG. 2.

Example system 100 in FIG. 1 may be implemented in a variety of ways. For example, all or a portion of example system 100 may represent portions of an example system 200 in FIG. 2. As shown in FIG. 2, system 200 may include a central computing device 202 in communication with a cloud service 206 and a set of networked devices 208 via a network 204. In one example, all or a portion of the functionality of modules 102 may be performed by central computing device 202, set of networked devices 208, and/or any other suitable computing system. Similarly, central computing device 202 and/or devices within set of networked devices 208 may be merged into a single machine or computing system such that the functionality of each of modules 102 is provided within a single device.

As will be described in greater detail below, one or more of modules 102 from FIG. 1 may, when executed by at least one processor of central computing device 202, enable central computing device 202 to prevent a security compromise of a user credential for a cloud service. For example, and as will be described in greater detail below, identification module 104 may identify, by central computing device 202, a set of networked devices 208. Encryption module 106 may encrypt, by central computing device 202, a user credential 210 for cloud service 206. Division module 108 may divide, by central computing device 202, decryption key 122 for decrypting user credential 210 into a set of fragments 212 such that a minimum number of fragments, as defined by security policy 124, is required to decrypt user credential 210. Security module 110 may secure user credential 210 by distributing set of fragments 212 of decryption key 122 from central computing device 202 to set of networked devices 208 in compliance with security policy 124.

In the example of FIG. 2, and as will be explained in greater detail below, central computing device 202 may first identify set of networked devices 208 via network 204. Central computing device 202 may then encrypt user credential 210 for cloud service 206, accessible by set of networked devices 208 via network 204. Next, central computing device 202 may divide decryption key 122, based on security policy 124, into set of fragments 212. Finally, central computing device 202 may distribute set of fragments 212 to set of networked devices 208 based on security policy 124.

Central computing device 202 generally represents any type or form of computing device capable of reading computer-executable instructions. For example, central computing device 202 may represent a network router controlling network access for a set of computing devices. Additional examples of central computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, and/or any other suitable computing device.

Network 204 generally represents any medium or architecture capable of facilitating communication or data transfer. In one example, network 204 may facilitate communication between central computing device 202, cloud service 206, and/or set of networked devices 208. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
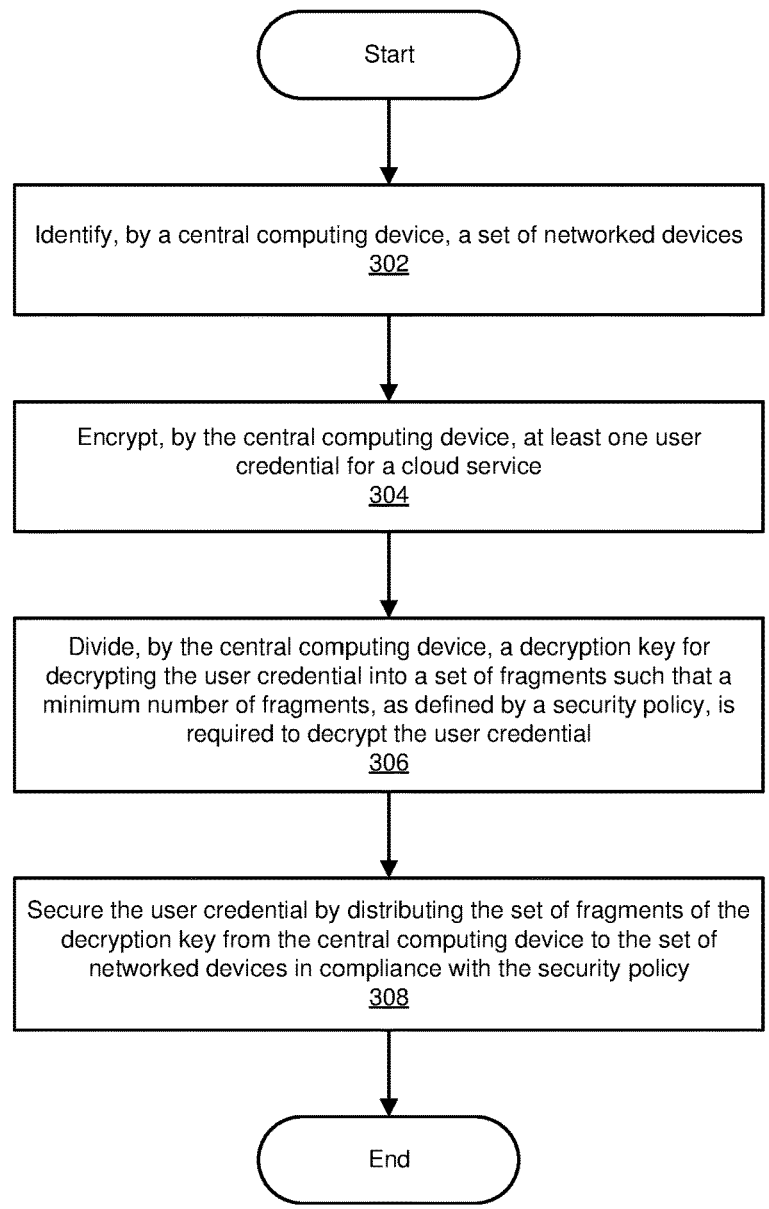
FIG. 3 is a flow diagram of an example method for securely sharing cloud-service credentials within a network of computing devices.

FIG. 3 is a flow diagram of an example computer-implemented method 300 for securely sharing cloud-service credentials within a network of computing devices. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify, by a central computing device, a set of networked devices. For example, identification module 104 may, as part of central computing device 202 in FIG. 2, identify set of networked devices 208.

Identification module 104 may identify set of networked devices 208 in a variety of ways. In one example, identification module 104 may detect all devices connected to network 204 and determine a device within set of networked devices 208 is capable of connecting to cloud service 206, such as by identifying specific device models and capabilities. In another example, identification module 104 may intercept network traffic on network 204 and detect attempts to access cloud service 206 by devices in set of networked devices 208. Additionally or alternatively, devices within set of networked devices 208 may register with central computing device 202 when initially connecting to network 204. Furthermore, devices in set of networked devices 208 may connect to each other via a local network, such as through BLUETOOTH technology. A device within set of networked devices 208 may then connect to cloud service 206 via network 204 and/or through central computing device 202.

Returning to FIG. 3, at step 304, one or more of the systems described herein may encrypt, by the central computing device, at least one user credential for a cloud service. For example, encryption module 106 may, as part of central computing device 202 in FIG. 2, encrypt user credential 210 for cloud service 206.

Encryption module 106 may encrypt user credential 210 in a variety of ways. In one embodiment, user credential 210 for cloud service 206 may include a user identifier, a password, a user key, an account name, a digital certificate, and/or a user token. As used herein, the term "user identifier" generally refers to a name, a user device identifier, and/or other distinct identifying information about the user. The term "user key," as used herein, generally refers to a digital key used to certify a user, such as a public or private key. The term "account name," as used herein, generally refers to a username and/or other information identifying a user's account. The term "digital certificate," as used herein, generally refers to an electronic document or data used to validate a user, a device, or an account. Finally, the term "user token," as used herein, generally refers to data representing a non-sensitive version of sensitive user credentials.

In some embodiments, encryption module 106 may encrypt user credential 210 by receiving user credential 210 from cloud service 206 and storing user credential 210 in database 120 in FIG. 1. In these embodiments, encryption module 106 may then encrypt user credential 210 with a key encryption method and store decryption key 122 in database 120. In other embodiments, encryption module 106 may receive and/or intercept user credential 210 from a device within set of networked devices 208. Furthermore, encryption module 106 may encrypt multiple user credentials with the same key encryption method and/or different key encryption methods. In these embodiments, user credentials may be decrypted with the same decryption key or different decryption keys.

Returning to FIG. 3, at step 306, one or more of the systems described herein may divide, by the central computing device, a decryption key for decrypting the user credential into a set of fragments such that a minimum number of fragments, as defined by a security policy, is required to decrypt the user credential. For example, division module 108 may, as part of central computing device 202 in FIG. 2, divide decryption key 122 for decrypting user credential 210 into set of fragments 212 such that a minimum number of fragments, as defined by security policy 124, is required to decrypt user credential 210.

Division module 108 may divide decryption key 122 in a variety of ways. In some examples, the minimum number of fragments required to decrypt user credential 210 may include a number less than a total number of devices in set of networked devices 208. In other words, the minimum number of fragments may be, at most, one less than the total number of devices so that the removal of one device from set of networked devices 208 may still allow the systems described herein to reconstruct decryption key 122. In these examples, the minimum number of fragments may be predefined in security policy 124 based on attributes of devices and/or cloud service 206 and/or as defined by a user or administrator. Furthermore, in some examples, decryption key 122 may remain intact, and set of fragments 212 may represent additional keys that, when combined, may reconstruct decryption key 122. In these examples, division module 108 may ensure the minimum number of additional keys required to decrypt user credential 210 may include a number less than the total number of devices in set of networked devices 208.

In one embodiment, security policy 124 may include a distribution policy based on a type of networked device, the total number of devices in set of networked devices 208, a type of user credential 210, and/or an importance of a fragment of decryption key 122 to reconstructing decryption key 122. For example, security policy 124 may determine that a user credential with more sensitive information may be distributed to networked devices that are more secure. As another example, security policy 124 may determine a crucial fragment of decryption key 122 that is required to reconstruct decryption key 122 may be stored on a more secure device, while other fragments may be interchangeable and stored on less secure devices. Alternatively, larger fragments may be stored on specific devices, such as a device that is more difficult to physically remove from a smart building.

Additionally or alternatively, security policy 124 may include an access policy based on the type of networked device and/or a type of cloud service 206. For example, security policy 124 may include a list of networked devices that may connect to different cloud services and, therefore, may store fragments of multiple decryption keys. As another example, security policy 124 may determine that cloud services including financial transactions may require distribution of fragments of decryption key 122 to more secure devices than cloud services providing social media functions.

Figure 4:
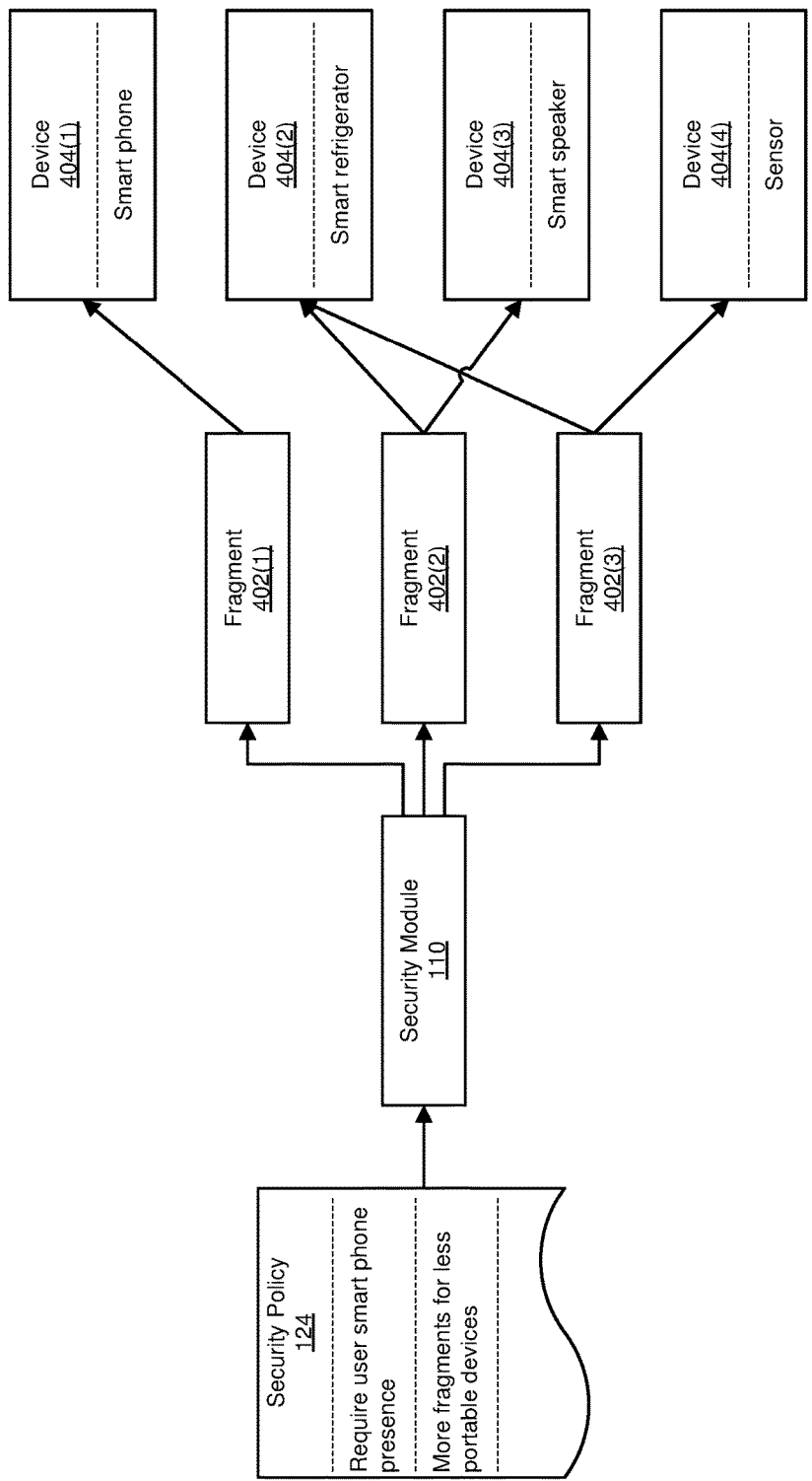
FIG. 4 is a block diagram of an example distribution of a set of fragments of a decryption key to a set of example devices.

For example, as shown in FIG. 4, security policy 124 may dictate that a user's smart phone must be present to decrypt user credential 210, as a proxy to determining that the user is physically present, and that more fragments may be stored on networked devices that are less portable and, thus, less likely to be removed from the network of devices. In this example, decryption key 122 may be divided into three fragments (e.g., a fragment 402(1), a fragment 402(2), and a fragment 402(3)), which is fewer than the number of networked devices (e.g., four devices).

Returning to FIG. 3, at step 308, one or more of the systems described herein may secure the user credential by distributing the set of fragments of the decryption key from the central computing device to the set of networked devices in compliance with the security policy. For example, security module 110 may, as part of central computing device 202 in FIG. 2, secure user credential 210 by distributing set of fragments 212 of decryption key 122 to set of networked devices 208 in compliance with security policy 124.

Security module 110 may secure user credential 210 in a variety of ways. In some embodiments, security module 110 may distribute set of fragments 212 of decryption key 122 by assigning at least one fragment of decryption key 122 to each networked device within set of networked devices 208 such that the networked device stores fewer than the minimum number of fragments required to decrypt user credential 210. In these embodiments, security module 110 may distribute multiple fragments to a device without allowing the device to store enough fragments to reconstruct decryption key 122. Security module 110 may push set of fragments 212 to set of networked devices 208 and/or respond to requests from set of networked devices 208 to distribute set of fragments 212. Furthermore, security module 110 may distribute set of fragments 212 using a secret sharing algorithm that allows a minimum number of devices to reconstruct decryption key 122 but not a single device. As used herein, the term "secret sharing" generally refers to a cryptography method for distributing shares of information among members of a group, such as a set of devices, to allow reconstruction by combining the shares.

In the example of FIG. 4, security module 110 may assign fragment 402(1) to only a device 404(1) (e.g., a smart phone) based on security policy 124 requiring a smart phone presence to decrypt user credential 210. Security module 110 may also assign both fragment 402(2) and fragment 402(3) to a device 404(2) (e.g., a smart refrigerator) based on security policy 124 allowing more fragments to be stored on networked devices that are less portable. More portable devices 404(3) and 404(4) may then be assigned a single fragment (e.g., fragment 402(2) and 402(3), respectively). In this example, a removal of device 404(2) or a combination of devices 404(3) and 404(4) may still allow decryption key 122 to be reconstructed. Although fragments 402(1), 402(2), and 402(3) are all needed to reconstruct decryption key 122 in the example of FIG. 4, in other examples, fewer fragments may be needed and/or required by security policy 124.

In further embodiments, security module 110 may redistribute set of fragments 212 in response to the loss or addition of a networked device. For example, security module 110 may redistribute a fragment on a removed device to another device or create a copy of a fragment to store on a new device. Additionally or alternatively, division module 108 may divide decryption key 122 into a new set of fragments, and security module 110 may then distribute the new set of fragments among set of networked devices 208 to replace set of fragments 212.

In some examples, the systems described herein may further include (i) detection module 112 that detects, by central computing device 202, a request for user credential 210 for cloud service 206 from a networked device, (ii) determination module 114 that determines, by central computing device 202, that the request for user credential 210 complies with security policy 124, (iii) collection module 116 that collects at least the minimum number of fragments required to decrypt user credential 210 from set of networked devices 208, and (iv) access module 118 that accesses cloud service 206 by decrypting user credential 210. In these examples, detection module 112 may receive a request for user credential 210 from a device via network 204. Additionally or alternatively, detection module 112 may intercept attempts to access cloud service 206 via network 204.

Determination module 114 may determine that the requesting device is allowed to access cloud service 206 and/or may request user credential 210, based on security policy 124. Collection module 116 may then collect fragments of decryption key 122 from set of networked devices 208 via network 204. In some examples, the requesting device may request fragments of decryption key 122, and collection module 116 may instruct set of networked devices 208 to send fragments to the requesting device.

In some embodiments, access module 118 may access cloud service 206 by reconstructing, by central computing device 202, decryption key 122 using the minimum number of fragments and sending decrypted user credential 210 to cloud service 206. In these embodiments, access module 118 may send decrypted user credential 210 to cloud service 206 by sending decrypted user credential 210 from central computing device 202 to cloud service 206 on behalf of the networked device and/or sending a temporary version of decrypted user credential 210 to the networked device. In these embodiments, the networked device may subsequently delete the temporary version of user credential 210.

Figure 5:
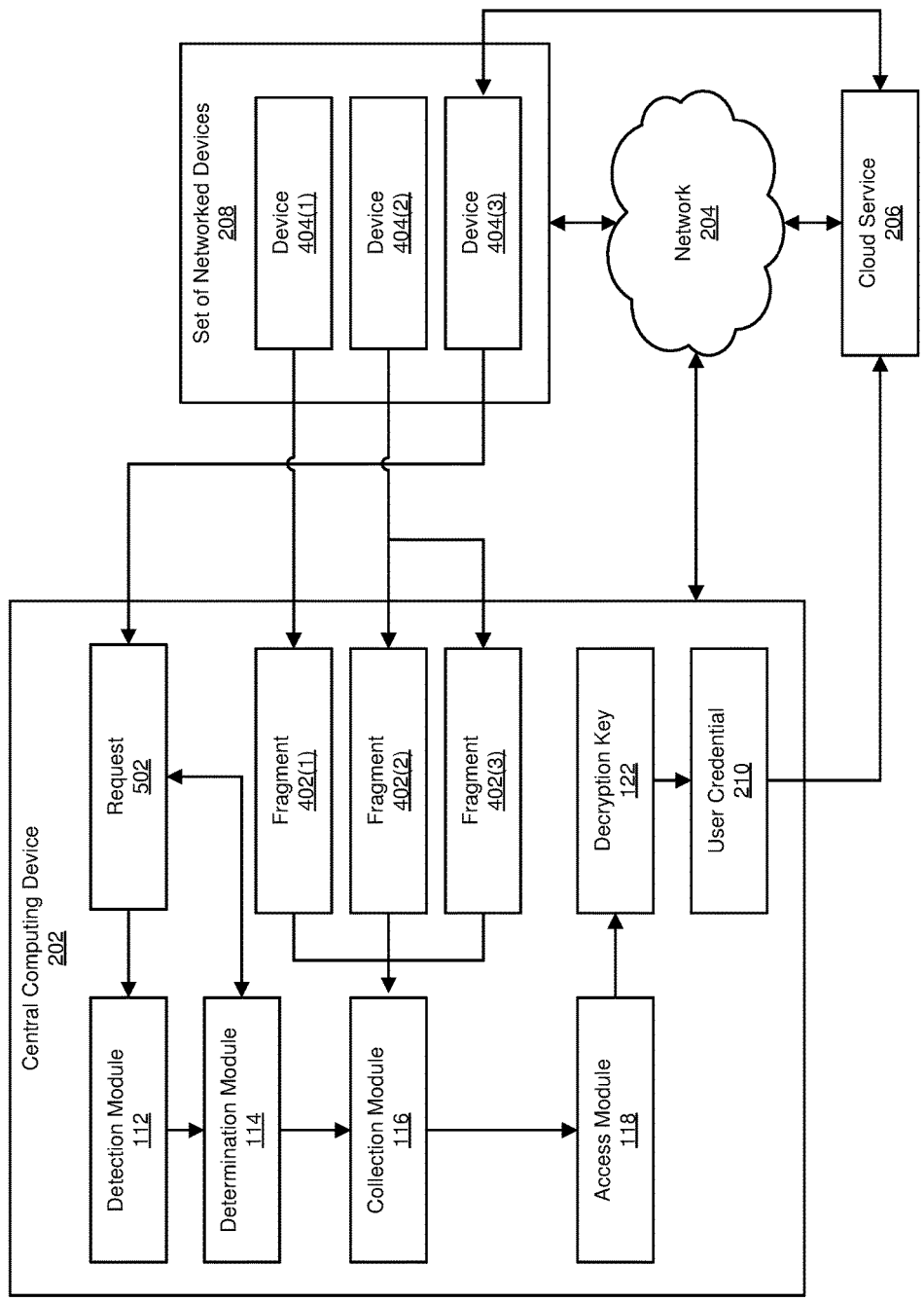
FIG. 5 is a block diagram of a request for an example user credential and decryption of the example user credential.

For example, as shown in FIG. 5, device 404(3) may send a request 502 for user credential 210 to central computing device 202. In this example, device 404(3) may represent a smart speaker, such as AMAZON ECHO, attempting to make an online purchase. Central computing device 202 may then determine that request 502 complies with security policy 124. Furthermore, in this example, device 404(4) from FIG. 4 may have been removed or stolen, and central computing device 202 may collect fragments of decryption key 122 from the remaining devices in set of networked device 208. Specifically, central computing device 202 may collect fragment 402(1) from device 404(1) and fragments 402(2) and 402(3) from device 404(2). Central computing device 202 may then reconstruct decryption key 122, decrypt user credential 210, and send user credential 210 to cloud service 206 on behalf of device 404(3).

In other embodiments, access module 118 may access cloud service 206 by sending a temporary version of the minimum number of fragments to the networked device to reconstruct decryption key 122 locally. For example, device 404(3) may collect fragments 402(1) and 402(3) and may reconstruct decryption key 122 by combining the collected fragments and fragment 402(2) stored on device 404(3). Device 404(3) may then send decryption key 122 to central computing device 202 or decrypt user credential 210 itself. After decrypting user credential 210 and accessing cloud service 206, device 404(3) may then delete fragments 402(1) and 402(3).

In further embodiments, access module 118 may access cloud service 206 by sending the minimum number of fragments to cloud service 206 to reconstruct decryption key 122. Alternatively, access module 118 may send the fragments to a separate cloud service to reconstruct decryption key 122. In these embodiments, cloud service 206 or the separate cloud service may then decrypt user credential 210 and/or send decryption key 122 to central computing device 202 to decrypt user credential 210 and, subsequently, delete the fragments of decryption key 122.

As explained above in connection with method 300 in FIG. 3, the disclosed systems and methods may, by encrypting user credentials for a cloud service and distributing decryption keys among smart devices in a network, ensure that the loss of one device will not compromise the security of a user credential. Specifically, the disclosed systems and methods may implement a form of secret sharing cryptography to distribute fragments of a decryption key such that a loss of a specified number of devices would not compromise the encryption and would still enable the remaining devices to decrypt the user credential. By distributing key fragments based on types of devices and the security of devices, the systems and methods described herein may facilitate an optimal sharing of decryption key fragments among various networked devices.

After distributing fragments of a decryption key, the disclosed systems and methods may then be able to reconstruct the decryption key with a minimum number of fragments, allowing for the removal or loss of some devices and key fragments. A smart device may request a user credential to access a cloud service, and the systems and methods described herein may decrypt the user credential using the reconstructed decryption key. If a device is missing, the systems and methods described herein may reconstruct the decryption key from fragments collected from the remaining devices.

As detailed above, by storing fragments of a decryption key rather than user credentials on networked devices, the disclosed systems and methods may prevent compromise of user credentials due to the loss or compromise of a networked device. In addition, by allowing redundancy of storing the same fragments on multiple devices, the disclosed systems and methods may prevent the loss of credentials themselves. Thus, the systems and methods described herein may improve the storage and security of credentials for cloud services.

Figure 6:
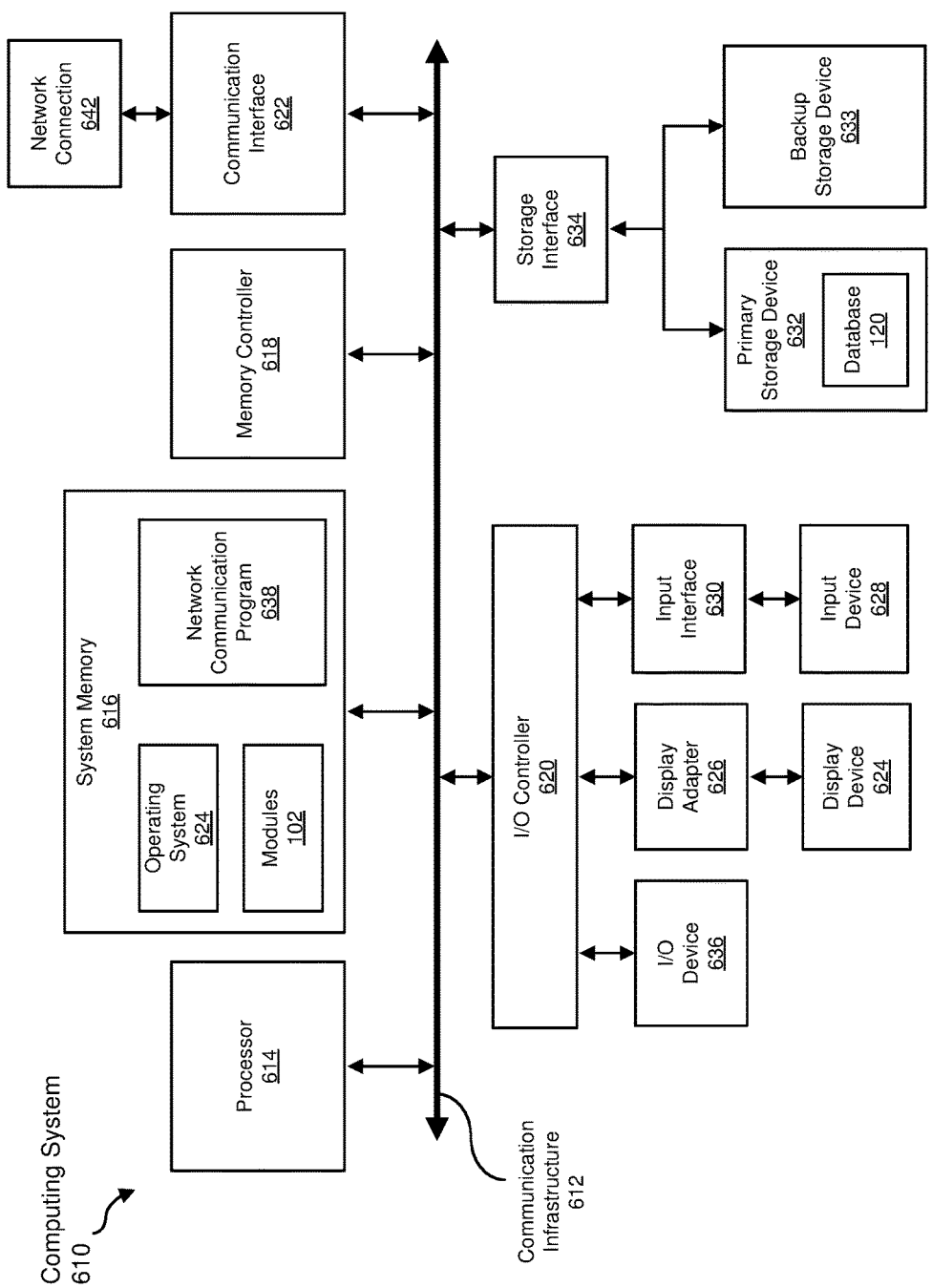
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 624 for execution by processor 614. In one example, operating system 624 may include and/or represent software that manages computer hardware and software resources and/or provides common services to computer programs and/or applications on computing system 610. Examples of operating system 624 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application-Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitorytype media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an ASIC adapted to implement one or more of the example embodiments disclosed herein.

Figure 7:
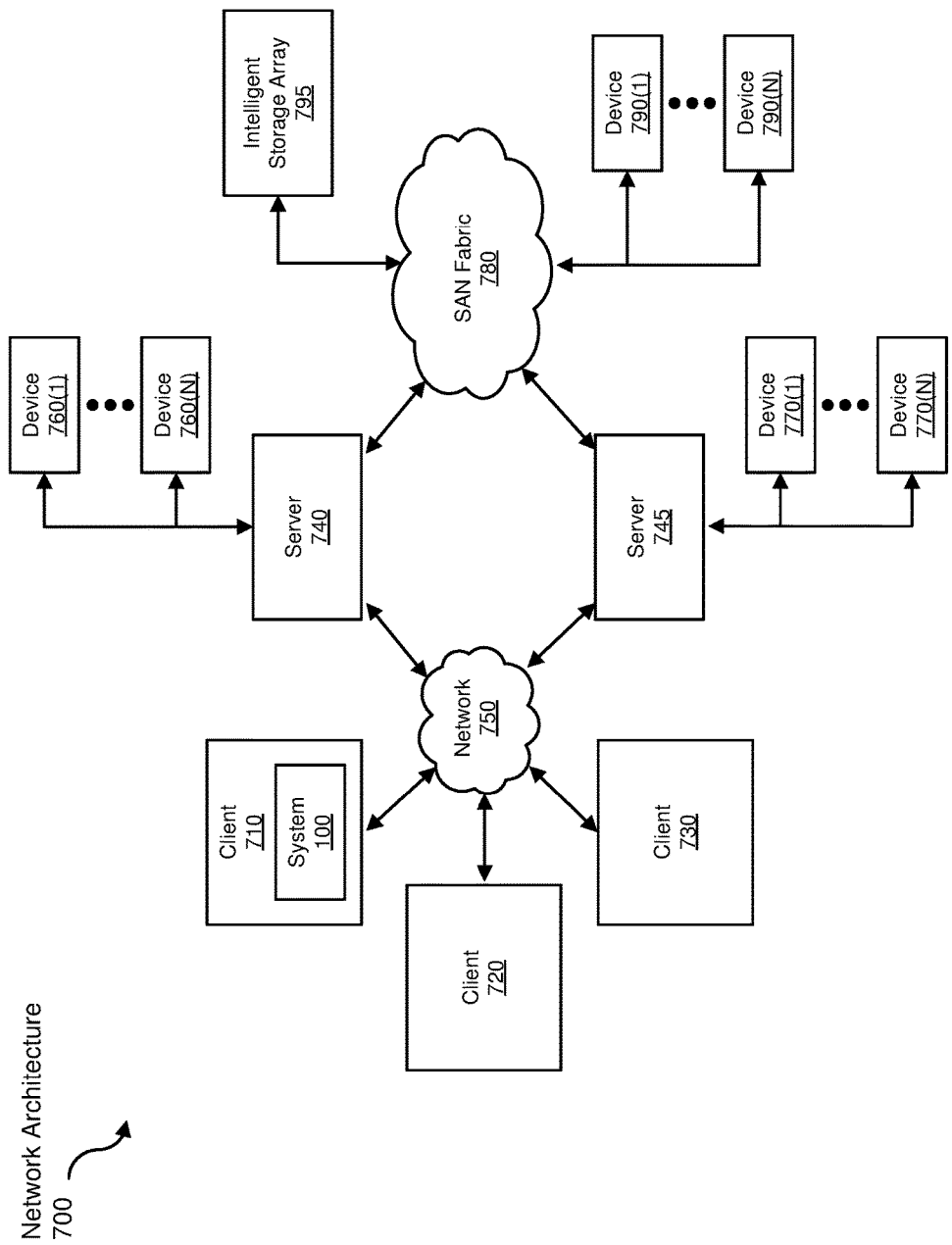
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for securely sharing cloud-service credentials within a network of computing devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered examples in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive a decryption key for a cloud-service user credential to be transformed, transform the decryption key, output a result of the transformation to a storage or output device, use the result of the transformation to distribute fragments of the decryption key among networked devices, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for securely sharing cloud-service credentials within a network of computing devices, at least a portion of the method being performed by a central computing device comprising at least one processor, the method comprising:
    identifying, by the central computing device, a set of networked devices;
    encrypting, by the central computing device, at least one user credential for a cloud service;
    dividing, by the central computing device, a decryption key for decrypting the user credential into a set of fragments such that a minimum number of fragments is required to decrypt the user credential, wherein the minimum number of fragments is defined by a security policy that includes a distribution policy for distributing the set of fragments to the set of networked devices by determining a distribution for each networked device depending on a physical portability of each networked device; and
    securing the user credential by distributing the set of fragments of the decryption key from the central computing device to the set of networked devices in compliance with the security policy such that collecting at least the minimum number of fragments required to decrypt the user credential from physically present networked devices is required to access the cloud service.

2. The method of claim 1, wherein the user credential for the cloud service comprises at least one of:
    a user identifier;
    a password;
    a user key;
    an account name;
    a digital certificate; and
    a user token.

3. The method of claim 1, wherein the minimum number of fragments required to decrypt the user credential comprises a number less than a total number of devices in the set of networked devices.

4. The method of claim 3, wherein the security policy comprises:
    the distribution policy based on at least one of:
        a type of networked device;
        the total number of devices in the set of networked devices;
        a type of user credential; and
        an importance of a fragment of the decryption key to reconstructing the decryption key; and
    an access policy based on at least one of:
        the type of networked device; and
        a type of cloud service.

5. The method of claim 1, wherein distributing the set of fragments of the decryption key comprises assigning at least one fragment of the decryption key to each networked device within the set of networked devices such that the networked device stores fewer than the minimum number of fragments required to decrypt the user credential.

6. The method of claim 1, further comprising:
    detecting, by the central computing device, a request for the user credential for the cloud service from a networked device;
    determining, by the central computing device, that the request for the user credential complies with the security policy;
    collecting at least the minimum number of fragments required to decrypt the user credential from physically present networked devices; and
    accessing the cloud service by decrypting the user credential.

7. The method of claim 6, wherein accessing the cloud service comprises:
    reconstructing, by the central computing device, the decryption key using the minimum number of fragments; and
    sending the decrypted user credential to the cloud service.

8. The method of claim 7, wherein sending the decrypted user credential to the cloud service comprises at least one of:
    sending the decrypted user credential from the central computing device to the cloud service on behalf of the networked device; and
    sending a temporary version of the decrypted user credential to the networked device.

9. The method of claim 6, wherein accessing the cloud service comprises sending a temporary version of the minimum number of fragments to the networked device to reconstruct the decryption key locally.

10. The method of claim 6, wherein accessing the cloud service comprises sending the minimum number of fragments to the cloud service to reconstruct the decryption key.

11. A system for securely sharing cloud-service credentials within a network of computing devices, the system comprising:
    an identification module, stored in memory, that identifies, by a central computing device, a set of networked devices;
    an encryption module, stored in memory, that encrypts, by the central computing device, at least one user credential for a cloud service;
    a division module, stored in memory, that divides, by the central computing device, a decryption key for decrypting the user credential into a set of fragments such that a minimum number of fragments is required to decrypt the user credential, wherein the minimum number of fragments is defined by a security policy that includes a distribution policy for distributing the set of fragments to the set of networked devices by determining a distribution for each networked device depending on a physical portability of each networked device;
    a security module, stored in memory, that secures the user credential by distributing the set of fragments of the decryption key from the central computing device to the set of networked devices in compliance with the security policy such that collecting at least the minimum number of fragments required to decrypt the user credential from physically present networked devices is required to access the cloud service; and
    at least one processor that executes the identification module, the encryption module, the division module, and the security module.

12. The system of claim 11, wherein the user credential for the cloud service comprises at least one of:
- a user identifier;
- a password;
- a user key;
- an account name;
- a digital certificate; and
- a user token.

13. The system of claim 11, wherein the minimum number of fragments required to decrypt the user credential comprises a number less than a total number of devices in the set of networked devices.

14. The system of claim 13, wherein the security policy comprises:
- the distribution policy based on at least one of:
  - a type of networked device;
  - the total number of devices in the set of networked devices;
  - a type of user credential; and
  - an importance of a fragment of the decryption key to reconstructing the decryption key; and
- an access policy based on at least one of:
  - the type of networked device; and
  - a type of cloud service.

15. The system of claim 11, wherein the security module distributes the set of fragments of the decryption key by assigning at least one fragment of the decryption key to each networked device within the set of networked devices such that the networked device stores fewer than the minimum number of fragments required to decrypt the user credential.

16. The system of claim 11, further comprising:
- a detection module, stored in memory, that detects, by the central computing device, a request for the user credential for the cloud service from a networked device;
- a determination module, stored in memory, that determines, by the central computing device, that the request for the user credential complies with the security policy;
- a collection module, stored in memory, that collects at least the minimum number of fragments required to decrypt the user credential from physically present networked devices; and
- an access module, stored in memory, that accesses the cloud service by decrypting the user credential.

17. The system of claim 16, wherein the access module accesses the cloud service by:
- reconstructing, by the central computing device, the decryption key using the minimum number of fragments; and
- sending the decrypted user credential to the cloud service.

18. The system of claim 16, wherein the access module accesses the cloud service by sending a temporary version of the minimum number of fragments to the networked device to reconstruct the decryption key locally.

19. The system of claim 16, wherein the access module accesses the cloud service by sending the minimum number of fragments to the cloud service to reconstruct the decryption key.

20. A non-transitory computer-readable medium comprising one or more computer-executable instructions that, when executed by at least one processor of a central computing device, cause the central computing device to:
- identify, by the central computing device, a set of networked devices;
- encrypt, by the central computing device, at least one user credential for a cloud service;
- divide, by the central computing device, a decryption key for decrypting the user credential into a set of fragments such that a minimum number of fragments is required to decrypt the user credential, wherein the minimum number of fragments is defined by a security policy that includes a distribution policy for distributing the set of fragments to the set of networked devices by determining a distribution for each networked device depending on a physical portability of each networked device; and
- secure the user credential by distributing the set of fragments of the decryption key from the central computing device to the set of networked devices in compliance with the security policy such that collecting at least the minimum number of fragments required to decrypt the user credential from physically present networked devices is required to access the cloud service.

* * * * *